US005698045A

United States Patent [19]
Walsh et al.

[11] Patent Number: 5,698,045
[45] Date of Patent: Dec. 16, 1997

[54] METHOD OF CLEANING POLYMER RESIDUES WITH NMP

[75] Inventors: William C. Walsh, Archbold, Ohio; Mark W. Waldrop, Royal Oak; Lawrence E. James, Gross Ile, both of Mich.; William Monahan, Alpharetta, Ga.

[73] Assignee: BASF Corporation, Mount Olive, N.J.

[21] Appl. No.: 730,987

[22] Filed: Oct. 16, 1996

Related U.S. Application Data

[63] Continuation-in-part of Ser. No. 421,340, Apr. 13, 1995, abandoned.

[51] Int. Cl.$^6$ ...................................... B08B 7/04
[52] U.S. Cl. .................. 134/12; 134/10; 134/11; 134/31; 134/37
[58] Field of Search ................. 134/10, 11, 12, 134/31, 37

[56] References Cited

U.S. PATENT DOCUMENTS

| | | |
|---|---|---|
| 2,886,547 | 5/1959 | Baggett et al. ............... 260/30.2 |
| 2,956,910 | 10/1960 | Giammaria .................... 134/22 |
| 3,673,099 | 6/1972 | Corby et al. .................. 252/156 |
| 3,764,384 | 10/1973 | Berni ........................... 134/12 |
| 3,804,924 | 4/1974 | Papetti et al. ................ 260/880 R |
| 4,009,048 | 2/1977 | Jensen et al. ................. 134/12 |
| 4,014,754 | 3/1977 | Berni et al. .................. 203/64 |
| 4,524,200 | 6/1985 | Sherk et al. .................. 528/388 |
| 4,976,825 | 12/1990 | Iwasaki et al. ............... 203/71 |
| 5,260,489 | 11/1993 | Robsein et al. .............. 568/34 |
| 5,310,428 | 5/1994 | Bhatt et al. .................. 134/2 |
| 5,334,255 | 8/1994 | James et al. ................. 134/38 |
| 5,594,035 | 1/1997 | Walsh .......................... 521/47 |

FOREIGN PATENT DOCUMENTS 1495249  12/1977  United Kingdom .

Primary Examiner—Jill Warden
Assistant Examiner—Sharidan Carrillo
Attorney, Agent, or Firm—Joanne P. Will

[57] ABSTRACT

The present invention is directed to a method of removing polymer residue from chemical processing equipment, comprising contacting said residue with NMP vapors.

5 Claims, No Drawings

METHOD OF CLEANING POLYMER RESIDUES WITH NMP

The present application is a continuation in part of U.S. Ser. No. 08/421,340 filed Apr. 13, 1995, now abandoned in favor of the present continuation in part.

FIELD OF THE INVENTION

The present invention relates to a method of cleaning polymer residue from chemical processing equipment using N-methyl pyrrolidone (NMP) vapors.

BACKGROUND OF THE INVENTION

During routine polymerization processes employed in the production of polymers, trace amounts of residual product plate out, or are deposited onto, the surfaces of the chemical processing equipment. Over extended periods of time, this initially thin molecular layer film of residue grows into a thick residue coating that impedes further production of the polymer with an accompanying decrease in economic return.

The polymer residue film deposits onto the surfaces of the various equipment parts involved in the polymerization process. Baffles, agitation blades and agitator shaft, glass surfaces on site glass openings, the top dome of the reactor, exit venting shafts, liquid transfer lines, and condensers, are a few examples of polymerization process equipment surfaces onto which the polymer residue plates out.

When the film thickness of the polymer residues reaches a critical point where the process becomes economically non-viable or creates safety concerns, the production processes are shut down so that the residue material can be cleaned away from the surfaces. The cleaning of chemical processing equipment, such as emulsion polymerization reactors, has been carried out in a number of different ways.

One method includes dismantling the equipment and placing the individual equipment pieces into large tanks filled with solvent or alkaline solution for soaking in order to dissolve the polymer residue. However, the dismantling of equipment often takes a long period of time. Also, if the buildup of the polymer residue is thick, this soak cleaning process can take several days time. Since emulsion polymerization reactor cleaning is usually carried out about every month to month and a half, and since this soak cleaning operation may take several days (e.g., 4–7 days), the soak cleaning method dramatically reduces the effective productivity of the reactor. When the reactor is large, as is often the case for emulsion polymerization reactors, this "down time" translates into substantial non-production of the product.

Another method is directed to physically blasting the polymer residue away from the reactor surfaces with high pressure water jets. However, high pressure water blasting increases the danger of injuries by the razor sharp jet of water. Moreover, if the emulsion polymerization reactor is large, the water blasting cleaning method necessitates the dismantling of the reactor, so that a worker can be lowered down into the reactor to ensure that the high pressure spray is directed into the proper direction and does not damage or displace the agitator shaft. Placing workers into confined spaces always carries with it an extra safety risk. Moreover, the empty reactor usually has to be filled completely with water and purged several times to insure that air concentrations of the reactant monomers, which may be toxic, are below the regulated maximum levels. Dismantling an emulsion polymerization reactor, and readying the air inside the reactor to acceptable breathable quality, is a time and labor intensive process. Again, the economic penalty of reactor "down time" is incurred when high pressure water blast cleaning is used.

Yet another suggested method has been to use a heated solvent, such as NMP, to nearly completely fill the reactor and dissolve the residue lining the equipment wall as disclosed in British Patent No. 1,495,249. The process of completely filling the emulsion polymerization equipment with a solvent so that all of the polymer residue is directly covered with and in contact with the liquid solvent is not an economically practical means of cleaning a large reactor.

For example, removing one foot or more thick films of styrene-containing polymer residue from the top dome of a 14,500 gallon reactor with NMP as the cleaning agent would be economically prohibitive. The near complete filling of the reactor with NMP so that the liquid solvent could come into contact with the polymer residue on the top of reactor is not a viable option due to the high purchase cost of NMP (about $1.80 per pound; 8.56 pounds per gallon) and transferring and storing costs (a 20,000 gallon tank would have to be constructed). Also, the practice of completely filling any reactor vessel and its attached equipment with a solvent or reactant chemicals, and then applying heat to the reactor, can be extremely dangerous.

OBJECT OF THE INVENTION

In view of the above-discussed shortcomings of the known methods, an object of the present invention is to provide a method of removing polymer residue from chemical processing equipment in an effective and economically efficient manner.

In particular, an object of the present invention is to provide a process which (i) allows for the chemical processing equipment to be cleaned without dismantling of the equipment, (ii) does not increase safety concerns by using a high pressure water jet, and (iii) also uses smaller quantities of solvent to avoid economic and safety disadvantages associated with the near complete filling of the equipment with solvent.

SUMMARY OF THE INVENTION

The above-stated objects have been achieved by the unexpected finding of the present inventors that the application of NMP vapors to the polymer residue is an effective and economically efficient way to clean chemical processing equipment.

In particular, the present invention is directed to a method of removing polymer residue from chemical processing equipment, comprising the steps of:

(a) adding a solution comprising liquid NMP to a region of said chemical processing equipment containing said polymer residue; wherein further, said added liquid NMP is of a volume about 20 to 66% of said processing equipment capacity; wherein further said added liquid NMP is not in physical contact with said polymer residue after said liquid NMP has been added to said region of the chemical processing equipment;

(b) heating said solution to a temperature at which the NMP is boiling, or greater to provide NMP vapors which contact and are absorbed into said polymer residue;

(c) cooling and condensing said absorbed NMP vapors into recycled liquid NMP, which returns to the heated solution and is re-vaporized and re-absorbed into polymer residue; and (d) dissolving said polymer residue with said NMP vapors.

DETAILED DESCRIPTION OF THE INVENTION

The present invention is directed to a method of removing polymer residue from chemical processing equipment, comprising the steps of:

(a) adding a solution comprising liquid NMP to a region of said chemical processing equipment containing said polymer residue; wherein further, said added liquid NMP is of a volume about 20% to 66% of said processing equipment capacity; wherein further said added liquid NMP is not in physical contact with said polymer residue after said liquid NMP has been added to said region of the chemical processing equipment;

(b) heating said solution to a temperature at which the NMP is boiling, or greater, to provide NMP vapors which contact and are absorbed into said polymer residue;

(c) cooling and condensing said absorbed NMP vapors into recycled liquid NMP, which returns to the heated solution and is re-vaporized and re-absorbed into polymer residue; and (d) dissolving said polymer residue with said NMP vapors.

Specifically, the present method uses NMP vapors to remove polymer residue from chemical processing equipment in an effective and economically efficient manner. Liquid NMP is initially added to a region of the chemical processing equipment containing the polymer residue. The liquid NMP is not in physical contact with the polymer residue.

Various types of polymer residues can be removed from chemical processing equipment under the present method, including residues from styrene-containing polymers, polyvinyl chlorides, urethanes, epoxies, polyacrylics, nylons, burnt-on carbon buildup, and tary films formed when organic materials thermally degrade. Preferably, this method is directed to removing sytrene-containing polymer residues, such as styrene-butyl acetate-acrylonitrile (SAA) and polystyrene.

Any type of chemical processing equipment used for reaction, manufacture, storage and transport of chemicals, and which retains polymer residue following contact with the chemicals, may be cleaned under the present method. For example, entire polymerization reactors, baffles, agitation blades, agitator shafts, glass surfaces on site glass openings, the top dome of the reactor, exit venting shafts, liquid transfer lines, condensers, holding tanks, portable tote tanks, distillation columns (build up on plates), heat exchangers, tank trucks/rail cars, and pipe lines or transfer lines, and other types of chemical processing equipment may be cleaned under the present method. The present method is especially suited to large chemical processing equipment, such as emulsion polymerization reactors. In order to establish a vacuum and thus lower the boiling point of NMP, the chemical processing equipment is preferably air-tight, or is placed in an air-tight environment.

The structure and methods of making NMP are well-known in the art. NMP (N-methyl pyrrolidone) is commercially available from the BASF Corporation and Arco Chemical Co. Under the trade name NMP, and is also sold commercially under the trade name M-PYROL by ISP Corporation.

The solution comprising NMP (hereinafter, "NMP solution") may be substantially pure NMP, or NMP and additional materials. For example, a blend of NMP and the solvent gamma butyrolactone may be used, since certain grades of NMP contain amounts of gamma butyrolactone (a raw material for NMP manufacture) and this does not interfere with the present method. Moreover, the addition of materials which aid in the removal of polymer residue may be used. For example, oils or solvents having a higher boiling point than NMP may be used in combination with NMP to catch the dissolved polymer residue dislodged from the chemical processing equipment by the NMP vapors, and may cost effectively decrease the amount of NMP necessary for the cleaning process.

The amount of solution comprising liquid NMP used in reactor is not critical, as long as a sufficient amount of NMP vapor may be generated to fill the reactor upon boiling the solution comprising liquid NMP. Preferably, the vessel to be cleaned is filled to approximately 20 to 66% of its capacity with a solution comprising NMP. The amount of NMP to be added can also be expressed as a multiple of the weight of polymer residue to be removed. Specifically, the weight amount of NMP added to the chemical processing equipment should be at least approximately three times, preferably approximately 8 to 9 times, the weight amount of polymer residue on the equipment.

After adding the solution comprising liquid NMP into the equipment as described above, the solution is heated to provide NMP vapors which contact and are absorbed into said polymer residue.

The heating temperature of the solution comprising liquid NMP is not critical as long as it is sufficient to boil the liquid NMP and provide NMP vapors. The normal boiling point for NMP is 202° C. Thus, heating the liquid NMP to 202° C. or above at atmospheric pressure (760 mm Hg) will allow the NMP to boil and generate sufficient vapor to accomplish the removal of the residue.

For the chemical processing equipment which cannot be heated up to 202° C., a vacuum should be applied so that NMP will boil at a lower temperature. The preferred NMP temperature range for this cleaning process is between about 80° C. and about 135° C., more preferably about 115° C. to about 130° C. The vacuum being applied will have to be sufficient for the NMP vapor pressure to be between 10 mm Hg and 100 mm Hg, so that the NMP can be boiling and generating an effective amount of vapor to solvate the polymer residue. Other temperatures and vacuum variations sufficient to allow the NMP liquid to boil, but outside of the above-discussed range, may also work for this invention. One skilled in the art would be aware of the many temperature and pressure variations which would bring NMP to a boil, and provide the required NMP vapors.

The NMP vapors are absorbed into the polymer residue and cause the dissolution of the polymer residue from the chemical processing equipment into the solution.

Cooling of the NMP vapors by cooling the outside of the chemical processing equipment wall may be preferably used and has a two fold effect. First, once NMP vapor is absorbed into the polymer residue lining the equipment walls, the cooled equipment walls will rapidly condense the absorbed NMP vapor, and the weight of the condensation will cause polymer residue to flake off in large pieces from the wall. Second, the condensed NMP and residue flakes will fall into the heated solution, and the condensed NMP will boil and cause the further absorption of recycled NMP vapor into polymer residue remaining on the equipment walls.

The chemical processing equipment may be cooled in may ways, as one skilled in the art would recognize. For example, process water, (at a temperature low enough to cool the top walls of the reactor to a temperature of at least 10° C. cooler, preferably 15° C. to 30° C. cooler, than the temperature of the heated NMP solution) when contacted with the outside of the equipment wall, cools the wall and causes the rapid condensation of the NMP vapors already absorbed into the polymer residue. Application of the cooling water may take place constantly throughout the heating of the NMP solution, or may take place following an initial heating period to allow the polymer residue to become saturated with NMP vapor to provide the maximum polymer residue "flake off" upon cooling. This latter method may be discontinued, and then reapplied at several discrete time periods throughout the heating process, to maximize NMP vapor saturation into remaining polymer residue and subsequent flake off during cooling.

The amount of time necessary to remove all of the polymer residue from the chemical processing equipment is dependent on many factors, including the size of the equipment, the amount of polymer residue, and the amount of NMP. One skilled in the art would be aware of many variations of these and other factors, which effect the amount of time necessary to remove the polymer residue via the present method.

After a sufficient period of time, the heat is turned down and the NMP solution is allowed to cool to less than 38° C. If a vacuum is used, it is broken, and the NMP solution containing the polymer residue flakes is pumped out. One or more final water rinses trace NMP and polymer residue from the chemical processing equipment.

Preferably, the inventive cleaning process may be implemented in two stages to remove polymer residue, such as styrene-containing polymer residue, from chemical processing equipment, such as emulsion polymerization reactors.

First, a slight vacuum is applied to the reactor system. The vacuum should be sufficient enough to allow the air in the air space above the reactor to have an oxygen content of lower than the explosive limit for NMP vapors (11 to 13% oxygen content of air). The reactor is locked in at this slight vacuum. The NMP solution is then heated up to about 130° C. and allowed to generate some NMP vapor (the vacuum applied is very slight, e.g., about 500 to 600 mm Hg; and the NMP is not at its boiling point for this pressure). The NMP vapor travels to the top of the reactor and is absorbed by the film of styrene-containing polymer residue. The duration of this vapor absorption step is totally dependent upon the thickness of the polymer build up and can range from three/four hours to 10 hours or more. During this vapor absorption phase, the polymer residue is partially dissolved and the liquid NMP/dissolved polymer residue drips down into the solution comprising NMP. When cleaning styrene-containing polymer residue, this dissolution creates a slight pink cast in the bottom of the reactor caused by a complex of the NMP and some partially polymerized short chain styrene polymer.

The second step in this NMP vapor cleaning process involves the gradual increase of the vacuum until the vacuum reaches a point that allows a vapor pressure above the NMP solution sufficient to allow the NMP to boil at that temperature at which the initial vapor absorption phase took place. When the NMP begins to boil, the top section of the reactor is cooled to a point that is at least 10° C. less than the temperature at which the NMP liquid is boiling.

At this point, the styrene-containing polymer residue film begins to get so heavy due to the large quantity of absorbed NMP vapor that its weight causes the residue film to begin to flake off in large chunks and fall down into the NMP solution at the bottom of the reactor. This flaking off of the polymer residue continues until the residue film is completely removed from the surfaces of the reactor. Again, the duration of this flaking off process is dependent upon the thickness of the styrene-containing polymer residue build up.

The following Examples are intended for illustrative purposes only, and the invention should not be construed as being limited thereto.

EXAMPLES

Example 1

900.0 g of NMP (N-methyl pyrrolidone) were added to a 3.0 liter glass distillation pot. The pot was placed into an insulated electric heating shell, and a 2 inch elliptical shaped magnetic stirring bar was added to the pot as a means to provide agitation. The shell was then placed onto a magnetic stirring apparatus.

Attached to the pot, through one of the four openings in the top of the pot, was a glass reflux column (approximately 10 inches in length). Attached to the top exit point of the reflux column was a jacketed glass condensing tube that lead to a 500 ml glass flask to catch any carry over NMP vapors.

A piece of partially polymerized styrene-containing polymer (styrene-butyl acrylate-acrylonitrile) residue, in the shape of a rectangular column (4.0 inches×1.0 inches×0.5 inches) was attached to a piece of copper wire, and hung into the 3.0 liter distillation pot. The piece of polymer was suspended in the open air space, within the pot approximately three inches above the surface of the liquid NMP. The intent of this experiment was to determine whether or not NMP vapors could dissolve the styrene-containing polymer residue.

A tube supplying a nitrogen bleed was attached to one of the opening(s) on the top of the pot (to replace oxygen and eliminate explosion risk), and a thermometer was inserted into the final opening to the pot. A vacuum was applied to the system (8 mm Hg), the agitation was turned on, and heat was applied to the pot.

The temperature of the pot was maintained at 100.0±5° C., and the NMP was boiling. For the first 2 hours of the experiment, the top portion of the glass pot, which was sticking out of the heating bowl, was left uninsulated. The NMP hit the cool glass and condensed back down into the pot. Also, during this time, NMP vapors were being absorbed by the piece of styrene-containing polymer.

Some portions of the piece of polymer began to flake off and fall down into the pot of liquid NMP, other portions of the polymer that were hard and glassy in consistency began to turn pink in color, and melt down into the pot of NMP.

At the 2 to 2.5 hour mark of the experiment, the exposed glass of the distillation pot was insulated with fiber glass insulation (one and one half inch thick). This caused the NMP vapors to travel up the distillation reflux column and then drip back down into the pot. Some small amount of the vapors traveled over into the 500 ml collection flask.

The piece of styrene-containing polymer was suspended in the NMP vapors for an additional 4 hours (a total of 6 hours). Observations were periodically made over this time frame as the piece of polymer was gradually dissolved by absorbing the NMP vapors. At the end of the 6 hours, the experiment was stopped as the piece of polymer was totally dissolved. No polymer was left on the copper wire.

At no time during the experiment did liquid NMP come into contact with the styrene-containing polymer. The piece of polymer absorbed vapors and the polymer dissolved after it picked up a sufficient volume of NMP.

Example 2

300.0 lbs of NMP were added to a 90 gallon reactor. (300.0 lbs of NMP is 34.8 gallons) 296.0 grams of styrene-containing polymer residue were placed into a stainless steel mesh cylindrical shaped basked (2.0 feet long×3.0 inches in diameter). The basket was suspended in the open air space of the reactor, above the surface of the liquid NMP.

The agitator of the reactor was turned on, and the heat was gradually increased to 107° C., as a vacuum was applied of 20 mm Hg. In one half hours time, it was observed that a vigorous boiling of the NMP was occurring. This vigorous boiling was decreased in order to insure that liquid NMP did not contact the styrene-containing polymer residue by increasing the pressure and thus reducing the NMP solution to a slow boil.

Gradually over an 8 hour period, the NMP vapors dissolved the styrene-containing polymer residue "chunks" in the basket. Thin trails of the polymer could be seen "oozing" out of the bottom of the basket and flowing down into the liquid NMP. Small chunks that flaked off of the large chunks in the basket could be seen floating on the surface of the NMP. Also, the pink coloring of both sections of the polymer chunk indicated NMP/styrene polymer complexes.

At the 8 hour mark, the temperature of the NMP was at 149° C. and the vacuum being applied was 147 mm Hg. The reactor was cooled down, the basket was removed and the contents weighed. It was noted that approximately one half of the original styrene-containing polymer residue had been dissolved by the NMP and flowed down into the liquid NMP.

Example 3

4079.2 gallons of NMP were added to a 14,500 gallon reactor that had been used in the emulsion polymerization of a styrene-containing polymer. This reactor had not been cleaned in the last six and a half weeks preceding the NMP trial, and there was a large build up of styrene-containing polymer residue covering almost the whole top dome of the reactor (approximately 8.0 inches thick).

Over a 3 hour period, the temperature of the NMP was raised to 132° C. (The NMP was agitated during the entire length of this trial). At this point a vacuum was slowly applied until the point of the 105 mm Hg was reached. The NMP was boiling. The reactor was then blocked off, and the NMP was allowed to boil and generate vapors that were being absorbed by the thick sections of styrene-containing polymer residue on the top of the reactor.

This boiling, with the reactor blocked in, continued for 10 hours. The NMP vapors were continually absorbed by, and saturating the polymer residue. Some sections of the surface of the polymer residue turned pink and red during this time period, as well as the liquid NMP, indicating that some of the polymer was falling into the NMP solution.

After 10 hours of boiling at 132° C., the cooling water of the top 4 foot section of the reactor was turned on. The dome of the reactor cooled down to 121° C. This caused large quantities of NMP vapors to condense out on the surface of the polymer residue, and then run back down the sides of the reactor into the liquid NMP.

The extra weight of the liquid NMP in the already saturated polymer residue, caused the polymer to begin to flake off and fall down into the NMP solution. At times it appeared as though it was "snowing" polymer residue inside the reactor, since the flaking styrene-containing polymer residue is white in appearance.

The reactor was left in this reflux condition for 20.0 hours. At this point, it was shut down, cooled off, and a porthole on the top of the reactor was opened. It was observed, that all of the polymer residue had been dissolved away from the top of the reactor by the NMP vapors. The reactor was clean.

The liquid NMP was pumped out of the bottom of the reactor, and a sample was taken so that a total solids test could be carried out. This test showed that the NMP vapors had dissolved 1,723.0 lbs of styrene-containing polymer residue from inside the reactor.

Example 4

200.0 mls, of N-methyl pyrrolidone (NMP), were added to a 1,000 ml round pyrex glass boiling flask. The flask had four openings on the top. Into one opening was placed a temperature probe. The second opening was used as an exit port for any NMP vapors that were not condensing inside the flask. A 12 inch high water cooled straight channel glass column that allowed any vapors, which did escape, to empty into a 500 ml collection flask. Into the middle opening was placed an agitator column. The motor driving the agitator column was controlled by a Rheostat that had gradations from zero to one hundred.

Into the final opening was placed a 3.4 gram chunk of polyurea urethane residue, that had been scraped from the dome of a urethane pre-polymer system reactor. The residue was wrapped with copper wire in an open weave screen construction. The residue chunk was hung in the open air space above the surface of the liquid NMP (approximately 4 to 4.5 inches above the surface). The boiling flask was sealed tight, and a GLAS COL insulated electrical heating jacket was placed around the boiling flask. The temperature probe and the heating jacket were plugged into the same control system, and the switch for heating was turned on. The temperature control was set at 101° C.±5° C. The agitator was turned on (rheostat was set at the 50 setting), and a vacuum of approximately 8.7 mm Hg was applied to the system through an opening in the 500 ml vapor collection flask.

The NMP gradually heated up from room temperature 24° C. to 101° C. At this point, the NMP was boiling, and some vapors were traveling up the water cooled condensing column, about half the length, and condensing out of the air and flowing back down the column into the boiling flask.

NMP vapors began to condense and run off of the chunk of residue approximately 2 hours after the NMP began boiling. At this point, the polyurea urethane residue had absorbed its capacity of NMP vapors, and was now starting to melt away by additional vapors. Slowly, the "chunk" began to get smaller and smaller, and at the 4 hour and 35 minute mark became too small to stay in the copper wire wrapping, and fell down into the liquid NMP.

Example 5

660.0 mls of N-methyl pyrrolidone (NMP) were added to a 1,000 ml round pyrex glass boiling flask. The boiling flask was the same flask, having four top openings, described in Example 4 above. The same temperature probe, agitator shaft and exit vapor collection system, as described in Example 4, were inserted into three of the openings. Also, the same insulated electric heating jacket was wrapped around the flask.

Into the fourth opening was placed a 2.7 gram chunk of styrene acrylonitrile acrylate polymeric residue. The chunk of residue was wrapped with copper wire in an open weave screen construction. The residue chunk was hung in the open air space above the surface of the liquid NMP. The residue was right up almost flush with the dome of the boiling flask.

The distance from the chunk to the surface of the liquid NMP was about 2 inches with the agitator turned off, and about 1 inch when the agitator was being run at its highest speed.

The boiling flask was sealed tight, and the heating element was turned on. The temperature control was set at 101° C., and the vacuum was applied (8.7 mm Hg). The agitator was turned on to its fastest setting (rheostat set at 100). The NMP gradually heated up from 24° C. to 101° C. At this temperature the NMP was boiling, and some vapors began traveling up the water cooled condensing column, only to turn back into liquid about half way up the column, and flow back down into the boiling pot.

NMP vapors began to condense and run off the chunk of polymer residue about the 2 hour and 45 minute mark. At this point, the styrene acrylonitrile acrylate had absorbed its capacity of NMP vapors and was now starting to melt away by additional vapors. Slowly the chunk became smaller and smaller and at the 6 hour and 20 minute mark became too small to be contained by the copper wire wrapping and fell down into the liquid NMP. (Note: The styrene acrylonitrile acrylate residue is a more crystalline residue (hard non-porous). It is harder to absorb vapors into this type of structure than into the rubber like polyurethane urea residue. Hence, the longer dissolving time.)

We claim:

1. A method of removing polymer residue from chemical processing equipment, comprising the steps of
   (a) adding a solution comprising liquid NMP to a region of said chemical processing equipment containing said polymer residue; wherein further, said added liquid NMP is of a volume about 20 to 66% of said processing equipment capacity; wherein further said added liquid NMP is not in physical contact with said polymer residue after said liquid NMP has been added to said region of the chemical processing equipment;
   (b) heating said solution to a boiling point of NMP or greater to provide NMP vapors which contact and are absorbed into said polymer residue;
   (c) dissolving said polymer residue with said NMP vapors cooling and condensing said absorbed NMP vapors, causing the polymer residue to flake off from the chemical processing equipment, wherein the condensed NMP vapors and polymer residue combine with the heated liquid NMP solution; and
   (e) recycling the heated liquid NMP solution by re-heating the liquid NMP to produce NMP vapors which contact, absorb, and remove additional polymer residue present in said chemical processing equipment.

2. The method of claim 1, wherein said polymer residue is styrene-containing polymer residue.

3. The method of claim 1, wherein the amount by weight of liquid NMP is approximately three times the amount by weight of polymer residue in said chemical processing equipment.

4. The method of claim 1, wherein said absorbed NMP vapors are cooled by contacting outer walls of said chemical processing equipment with water at a temperature at least 10° C. lower than the temperature of said solution comprising NMP.

5. The method of claim 4, wherein the contacting of said outer walls with water is periodically interrupted to allow re-heating of said outer walls and subsequent re-cooling upon re-introduction of said water.

* * * * *